United States Patent
Schwarz

(10) Patent No.: US 7,113,805 B1
(45) Date of Patent: Sep. 26, 2006

(54) METHOD OF COMBINING FIXED-NETWORK TELEPHONE AND MOBILE RADIO TELEPHONE COMMUNICATIONS

(75) Inventor: Holger Schwarz, Benglen (CH)

(73) Assignee: E-Plus Mobilfunk GmbH, (DE)

( * ) Notice: Subject to any disclaimer, the term of this patent is extended or adjusted under 35 U.S.C. 154(b) by 0 days.

(21) Appl. No.: 09/958,161

(22) PCT Filed: Nov. 17, 1999

(86) PCT No.: PCT/EP99/08837

§ 371 (c)(1),
(2), (4) Date: Oct. 5, 2001

(87) PCT Pub. No.: WO00/62568

PCT Pub. Date: Oct. 19, 2000

(30) Foreign Application Priority Data

Apr. 7, 1999 (DE) .................. 199 15 548

(51) Int. Cl.
*H04M 1/00* (2006.01)
(52) U.S. Cl. .............. 455/552.1; 455/127.4; 455/550.1
(58) Field of Classification Search ......... 455/426.1, 455/425.2, 445, 458, 459, 460, 461, 518, 455/417, 421, 422.1, 425, 552.1, 550.1, 553.1, 455/127.4
See application file for complete search history.

(56) References Cited

U.S. PATENT DOCUMENTS

| | | | | |
|---|---|---|---|---|
| 5,455,863 A | * | 10/1995 | Brown et al. | 380/247 |
| 5,963,864 A | * | 10/1999 | O'Neil et al. | 455/445 |
| 6,073,003 A | * | 6/2000 | Nilssen | 455/402 |
| 6,192,231 B1 | * | 2/2001 | Chapman et al. | 455/401 |
| 6,253,088 B1 | * | 6/2001 | Wenk et al. | 455/462 |
| 6,327,470 B1 | * | 12/2001 | Ostling | 455/437 |
| 6,360,091 B1 | * | 3/2002 | Schellinger et al. | 455/403 |
| 6,459,688 B1 | * | 10/2002 | Bursztejn et al. | 370/329 |
| 6,526,277 B1 | * | 2/2003 | Zicker et al. | 455/426.2 |
| 6,594,484 B1 | * | 7/2003 | Hitchings, Jr. | 455/414.1 |
| 6,681,118 B1 | * | 1/2004 | Raffel et al. | 455/552.1 |
| 6,735,432 B1 | * | 5/2004 | Jarett et al. | 455/417 |
| 6,775,546 B1 | * | 8/2004 | Fuller | 455/445 |

FOREIGN PATENT DOCUMENTS

| | | |
|---|---|---|
| DE | 43 43 335 A 1 | 6/1995 |
| EP | 0915628 A2 * | 11/1997 |
| WO | PCT/SE96/00273 | 3/1996 |
| WO | PCT/GB96/03135 | 12/1996 |
| WO | PCT/US98/04357 | 3/1998 |

* cited by examiner

Primary Examiner—CongVan Tran
(74) Attorney, Agent, or Firm—Dorsey & Whitney LLP

(57) ABSTRACT

The invention relates to a method for combining landline network and mobile telephony with the use of at least a home cell, a landline network and a mobile network, whereby the user uses a dual mode terminal that operates both in cellular mode and in cordless mode.

10 Claims, 1 Drawing Sheet

METHOD OF COMBINING FIXED-NETWORK TELEPHONE AND MOBILE RADIO TELEPHONE COMMUNICATIONS

FIELD OF THE INVENTION

The invention relates to a method for combining landline and mobile telephony

BACKGROUND OF THE INVENTION

Mobile telephony and landline telephony are currently offered as two completely separate products. Therefore, the customer also gets separate telephone numbers, which he also must use in different networks with different telephones.

In addition, different rates are offered to the customer in both networks. The result of this is that the customer, if he is, e.g., at home, he must make a decision for outgoing calls, based on these rates, of whether he wants to use the landline network or mobile telephone network.

Potential callers must be informed of two telephone numbers, while each telephone number generally has its own answering machine or voice mail. Because of this, operation and use of telecommunication services becomes complicated.

To add to this, in households with several people, with analog user connections, only a single phone number is available. In contrast, in mobile telephones there is a trend toward personalizing telephone numbers.

For transparent usage of landline network and mobile phone network, the customer today has only the rudimentary beginnings, which are mainly based on call forwarding. An example will serve as an explanation:

1. If the customer will not be available, he call forwards his mobile telephone number to a landline number. An answering machine is connected to the landline connection.
2. If the customer will not be available, he call forwards his landline number to his mobile telephone number. If he cannot be reached at the mobile telephone number, there is a call forwarding to the voice mail in the mobile telephone network.

Several serious disadvantages result from this:

1. Handling the call forwarding for the two networks has to be carried out separately.
2. The call forwarding can only be changed by using the respective terminal (landline phone for landline phone numbers and mobile phone for mobile phone numbers).

SUMMARY OF THE INVENTION

The invention is based on the task of preparing a method for combining landline and mobile telephony with great simplicity for the customer, which can also achieve a notable cost savings for the customer if necessary.

Solution

So that the user can be reached at any time when needed by using a single telephone number, an intelligent "Follow Me" Service (Personal Addressing Service) is provided. This ensures that the user can be reached at any time both with his landline telephone number as well as with his mobile telephone number. The user can optionally select which number he will communicate with. In households with several persons with an analog telephone connection, i.e., only a single landline telephone number, the telephone number of the landline connection assumes the function of the family telephone number. For ISDN connections with several phone numbers, the individual landline telephone number can assume a group number function if necessary.

For outgoing telephone calls using the concept presented, telephoning is carried out in the home cell at the landline rate and in the mobile telephone network at the mobile telephone rate.

For incoming telephone calls, the "Personal Addressing Service" decides the current valid rate and sends it to the network of origin. Depending on the capabilities of the network of origin, parts of the service can be blocked and/or carried out at the expense of the person being called.

When the term "dual mode equipment"is used in documents, this means that the telephone in question can operate both in cellular mode as well as in cordless mode. The cordless mode has priority over cellular mode, this means whenever possible the user communicates by way of his landline connection. Generally, this is a price advantage for the user and relieves the load on the mobile telephone network.

A cordless station is connected to the landline network. The cordless station forms the home cell.

The user himself can then be reached with his mobile telephone number with the "Personal Addressing Service" even if mobile telephone service is not available in buildings or if no mobile telephone service is available in the area in question.

If the dual mode device moves into the area of the cordless station, this is automatically recognized by the device. If possible, the device logs out of (mobile service) the mobile phone network and automatically logs onto the cordless station.

If the dual mode device moves out of the cordless station area, the device also automatically recognizes this. In this case, the device (as quickly as possible) logs back into the mobile telephone system.

The cordless station is multi-link capable as an option. This means one cordless station can operate several terminals. This is especially interesting for households with several people.

As was already explained, if necessary the user can communicate either with his mobile telephone number or his landline number.

In households with more than two people and an analog landline connection, the numbers can be interpreted as follows:

The landline telephone number (an analog connection) is the collective number for the household.

The mobile telephone number is the personal telephone number of the individual household member; the associated answering system is the personal answering system.

With ISDN connections, individual landline telephone numbers can be assigned to the individual household members. With a standard ISDN connection, however, the number of telephone numbers is usually limited to three. If, for example, one telephone number is reserved for a fax machine, the remaining telephone numbers can be interpreted as group numbers if there are mare than two persons in the household—e.g., for parents and children.

DETAILED DESCRIPTION

Figure 1:
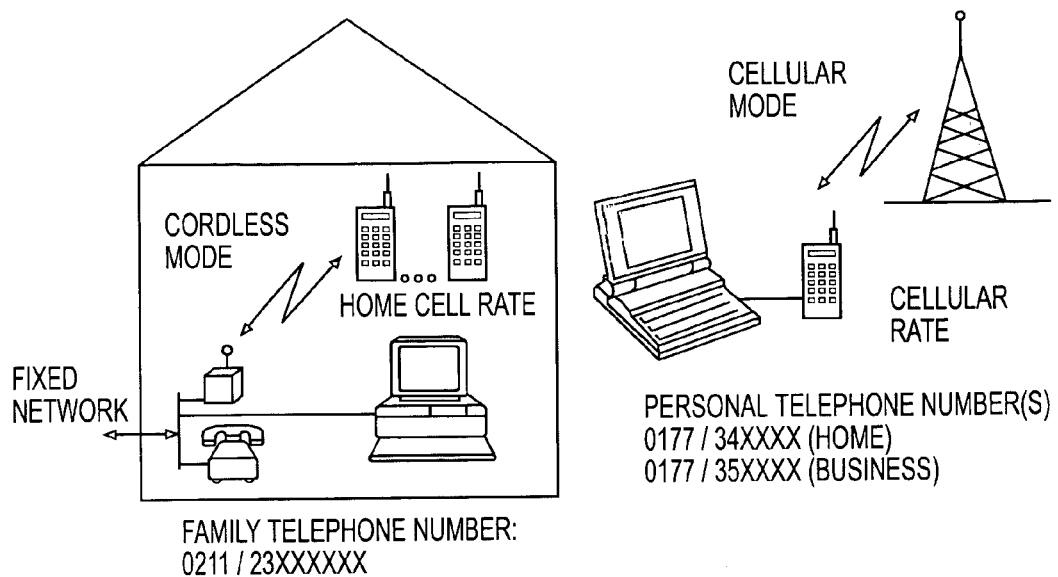
FIG. 1 is a schematic representation illustrating an embodiment of the invention.

A "Personal Addressing Service," which from the point of view of the user is not specific to either network, with the following service scope is set up in the landline network and in the mobile telephone network for incoming telephone calls:

1. Assignment of incoming mobile telephone calls;

2. Assignment of incoming landline telephone calls;

3. Abbreviated dialing for household members (calls within the family);

4. Service administration by the user;

5. Generation of rate information.

An opinion will be given further below on generating rate information.

When a mobile phone number is dialed—the personal number of the user—first an attempt is made to reach the associated mobile telephone. If this is not possible, e.g., for example because of a lack of cellular coverage, the phone is shut off, etc. and in fact, depending on what the user has preset, either the associated mobile telephone voice mail will be selected immediately or first the landline connection defined by the user. For each of the landline numbers, the user can assign an attribute (number type) that can have one of the three values 1. Collective number 2. Group number or 3. Individual number.

If it is a case of an "individual number" in the landline number, the user can assign a mobile telephone number. After selecting the landline number, first all connected telephones including the telephone in cordless mode will ring, while after expiration of a time period, which can be defined by the user if desired, there will be a forwarding directly to the personal answering system or first to the mobile telephone and then to the personal answering system.

If the landline number is a collective number or a group number, the user can store several mobile telephone numbers. The user can assign a personal statement to each mobile telephone number, e.g., the name of each user to whom the mobile telephone number is assigned as a personal telephone number. For each personal mobile telephone number there can be an initial specification of whether the mobile phone will answer first or whether the personal answering system will answer immediately.

If during the selection of the landline connection the call has not come yet within the time that was specified by the user, the caller is asked to decide on an individual user ("Who would you like to speak to?—Press 1 for Eva Meier or 2 for Fritz Meier.").

Depending on the user-defined settings, the caller will first be connected with the previously defined mobile telephone connection or immediately with the associated personal answering system.

An abbreviated dialing number can be defined for the individual telephone numbers of the household members, which serve for individual communication between members of the household.

In addition, the user has the option of changing the service settings either using the telephone keypad or by data communication, e.g., using the World Wide Web (WWW). As regards rate setting, with outgoing calls the rate can be set depending on the current mobile telephone operating mode (cordless or cellular) by the (implicit) selection of the network.

For incoming calls, the rate is set depending on the actual number called, at which the user is reached before the answering system. The requirement for this is that rate information data signal the network of origin and can be processed there. If this is not possible, for example for technical reasons or because the appropriate agreements have not been made, the corresponding share of the call—depending on what has been set by the user—can either be charged to the user subscriber or the caller will be connected to the personal answering system.

The "Personal Addressing Service" takes care of preparing the rate information and orders the signaling in the network of origin.

If the portion that has been forwarded has to be invoiced to the user subscriber, either an inquiry is made to the user subscriber of whether he will assume the costs or the call is placed immediately if the user has already set it up this way.

Dual mode terminals can currently be implemented in the combination DECT/GSM (GSM 900 or GSM 1800). In this case, the cordless station is a conventional (GAP) DECT station.

In 1999, the GSM Cordless Telephone System was set up in mobile telephone standardizing (ETSI-SMG). This solution will also produce the required dual mode functionality.

From the point of view of the user, the "Personal Addressing Service" will be presented as though it were non-network-specific. This can be achieved in that a common IN platform is provided for the landline and mobile telephone network on which the service described is available.

However, there are also divided service logics for the two networks with Service Control Points (SCPs) in both networks. The user has access to his service parameter by way of a non-network-specific Service Management Access Point (SMAP).

In the drawing, the invention is shown-in part schematically and as an example.

FIG. 1 Shows a schematic representation to illustrate the basic concept and

Figure 2:
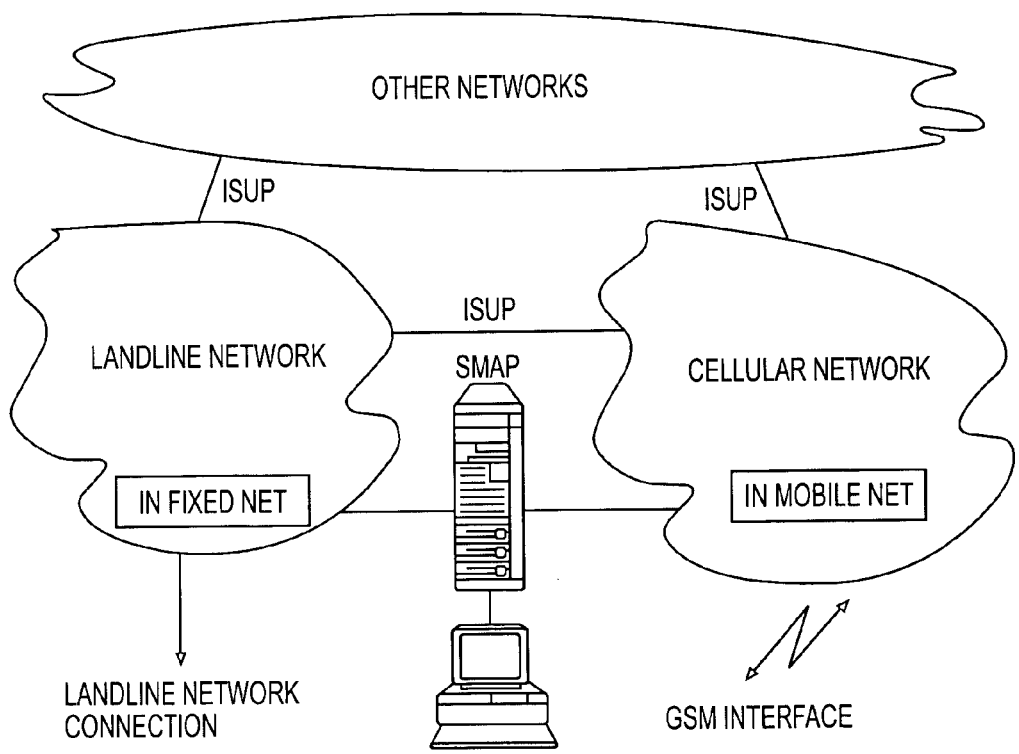
FIG. 2 is a diagram illustrating divided service logics with SCPs and SMAP.

FIG. 2 Divided service logics with SCPs and SMAP.

The basic principle can be seen in FIG. 1. In his home cell, the user telephones using his landline connection, when he is away from home he uses, as usual, the mobile telephone network. The telephone numbers shown should be understood as data used as an example and can be replaced by any telephone numbers.

FIG. 2 shows divided service logics for the two networks with SCPs in both networks, whereby the user has access to his service parameters by using a non-network-specific Service Management Access Point (SMAP).

The characteristics described in the summary, in the patent claims and in the description, as well as those that can be seen in the drawing, can be present both individually as well as in any combination for implementing the invention.

| Index of Abbreviations | |
| --- | --- |
| DECT/GSM | Digital Enhanced Cordless Telephone/Group Special Mobile |
| ETS/SMG | European Standard Communications/Special Mobile Group |
| GAP | |
| IN | Intelligent Network |
| ISUP | ISDN User Part |
| GSM-Luftschnittstelle | Global System for Mobile Communication |
| SCP | Service Control Point |
| SMAP | Service Management Access Point. |

The invention claimed is:

1. An apparatus adapted for use with both a landline network and a mobile telephone network comprising:
   a dual mode terminal that operates in cellular mode and in cordless mode, wherein the terminal during outgoing calls automatically sets up a connection using the most favorable available network,
   wherein the dual mode terminal is communicatively connected to at least one of a landline network and a mobile telephone network,
   wherein a personal addressing service adapted for use in at least one of the landline network and the mobile telephone network receives an incoming call and directly routes the incoming call to the dual mode terminal using either the landline network or the mobile telephone network;
   and wherein when, during reception of the call over the landline network, a connection with the dual mode terminal over the landline network is not completed, a caller is provided options including at least one of: (a) being connected with the dual mode terminal using the mobile telephone network; and (b) being connected with an answering system.

2. The apparatus according to claim 1, wherein when a caller initiates a telecommunications connection with the dual mode terminal by dialing a mobile telephone network number associated with the dual mode terminal a first attempt is made to establish a telecommunications connection with the dual mode terminal via the mobile telephone network and, if the telecommunications connection is not established, at least one second attempt is made to establish a telecommunications connection with at least one of an associated mobile telephone voice mail and the landline network.

3. The apparatus according to claim 1, wherein the dual mode terminal is associated with at least one landline network number, the landline network number further comprising at least one of a collective number, a group number, and an individual number.

4. The apparatus according to claim 2, wherein when the landline telephone network is associated with at least one of a collective telephone number and a group telephone number, and wherein the personal addressing service stores a plurality of mobile telephone numbers and any personal statements associated with any of the stored mobile telephone numbers.

5. The apparatus according to claim 1, wherein a telecommunications connection can be established with the dual mode terminal using an abbreviated dialing number.

6. The apparatus according to claim 1, wherein at least one service setting for the dual mode terminal can be changed by a user using at least one of a telephone keypad and data communications.

7. The apparatus according to claim 1, wherein a rate is set depending on a current operating mode of the dual mode terminal.

8. The apparatus according to claim 1, wherein for incoming calls a rate is set depending on an actual target phone number.

9. The apparatus according to claim 1, wherein for the landline network and the mobile telephone network a common platform is provided for service.

10. The apparatus according to claim 1, wherein divided service logics are set up for the landline network and for the mobile telephone network with service control points and wherein a user has access to at least one user's service parameter utilizing a Service Management Access Point that is non-network-specific.

* * * * *